United States Patent [19]

Pierce et al.

[11] Patent Number: 4,734,565
[45] Date of Patent: Mar. 29, 1988

[54] READ-ONLY OPTICAL CARD AND SYSTEM

[75] Inventors: Gerald A. Pierce, Redwood City; James L. Buxton, East Palo Alto, both of Calif.

[73] Assignee: Drexler Technology Corporation, Mountain View, Calif.

[21] Appl. No.: 46,952

[22] Filed: May 6, 1987

Related U.S. Application Data

[63] Continuation-in-part of Ser. No. 925,197, Oct. 31, 1986, which is a continuation-in-part of Ser. No. 794,336, Nov. 4, 1985, Pat. No. 4,634,850, which is a continuation of Ser. No. 541,166, Oct. 12, 1983, abandoned.

[51] Int. Cl.⁴ .............................................. G06K 7/10
[52] U.S. Cl. ................................. 235/454; 235/487
[58] Field of Search .................. 235/487, 454; 250/566

[56] References Cited

U.S. PATENT DOCUMENTS 4,634,850 11/1985 Pierce ........................... 235/454 X Primary Examiner—Harold I. Pitts
Attorney, Agent, or Firm—Thomas Schneck

[57] ABSTRACT

An optical data read-only card and system using a length of optical recording material in which data in the form of microscopic spots is disposed in cells forming a regularly spaced grid. The spots contrast with the background media with a reflective contrast ratio of at least 1.5 to 1. While the material is being moved in a lengthwise direction by a transport, rows of cells are being read one row at a time by a linear CCD array capable of detecting the contrasting reflectivities between spots and background.

24 Claims, 6 Drawing Figures

READ-ONLY OPTICAL CARD AND SYSTEM

DESCRIPTION

CROSS-REFERENCES TO RELATED APPLICATIONS

This application is a continuation-in-part of application Ser. No. 925,197, filed Oct. 31, 1986 which is a continuation-in-part of application Ser. No. 794,336 filed Nov. 4, 1985, now U.S. Pat. No. 4,634,850, which is a continuation of application Ser. No. 541,166 filed Oct. 12, 1983, now abandoned.

BACKGROUND ART

In prior U.S. Pat. No. 4,360,728, assigned to the assignee of the present invention, a banking card is disclosed suitable for use with automatic teller machines (ATMs). The patent describes a card having optical data written by a laser which forms pits in the medium. The medium itself is described as a thin metallic recording layer made of reflective metal. Types of reflective recording material suitable for use in such cards are described in U.S. Pat. Nos. 4,269,917; 4,304,848 and 4,363,870, all assigned to the assignee of the present invention. This material is characterized by reflective silver particles in a gelatin matrix. The silver particles form a reflective field which may be modified by laser writing or, in some instances, by photographic prerecording of information. Since the material described in the patents is based upon silver halide emulsions, exposure of data patterns and subsequent developing of the patterns leads to recording of data in a manner similar to laser writing. In either case, data is represented by spots or pits in a reflective field. Reflective spots in an absorptive field would also work.

In many optical data recording and retrieval systems, data has been recorded in linear tracks, analogous to magnetic recording. Data is read by following tracks, usually by means of servo systems. Attempts have been made to increase the data density of optical storage media without increasing the read error rate. Some lengthwise compression of data has been achieved in both magnetic and optical systems by means of clever modulation schemes, such as FM and MFM. In U.S. Pat. No. 3,980,818, Browning teaches data storage in a grid of perpendicular contiguous non-overlapping rows and columns. The data is read with a single detector in a raster scan-like manner.

In U.S. Pat. No. 4,105,926, Reno et al. teaches a transparent film containing indicia through which a light beam passes. A mirror behind the film reflects the beam so that it illuminates a small area of the film from behind. In the absence of opaque indicia at the illuminated spot, light is transmitted to a photodetector. The spots represent data bits with opaque spots representing ones and transparent spots representing zeros. In practice, there may be N parallel tracks and N respective photodetectors.

Unfortunately, a signal "crosstalk", i.e. detection of unwanted light from adjacent areas around an illuminated spot, often occurs when data spots and tracks are spaced too closely, due to the fact that some of the light from each track reaches photodetectors intended to receive light from other nearby tracks. In order to reduce crosstalk, the parallel tracks are typically not closely spaced and substantial blank space is provided between bit positions. Others, such as Browning, sacrifice speed in reading data for higher density by using only a single detector.

An object of the present invention was to devise a means for formatting optically recorded data for a data card, or the like, in a way that increases data density, while at the same time minimizes error resulting from crosstalk and other sources.

DISCLOSURE OF THE INVENTION

The above object has been achieved in an optical data read-only system in which data stored in a high density format is read at a high rate with minimum error. The system includes an optical storage medium, such as a data card with a strip of optical data storage material disposed thereon, and a linear CCD array. The strip can cover a portion of the card or an entire side of the card. High density is achieved by encoding data as microscopic spots aligned in specified data cell positions of a grid of perpendicular, non-overlapping, rows and columns of cell positions. The spots have a reflective contrast ratio relative to the surrounding field of the storage material of at least 1.5 to 1.

The optical medium is read reflectively by moving it relative to a linear array of optical detectors capable of detecting the contrast between the spots and field. The detector array is disposed for reading on the same side of the medium from a light source. The detector array is alligned perpendicular to the direction of lengthwise card motion for simultaneously reading each cell position in a row of cell positions. At least two of the detector cells read each specified cell position for minimizing error. Groups of similar cells simultaneously read a plurality of specified data cell positions.

Since the linear detector array is perpendicular to the direction of motion, there is no need for "track following" in the traditional sense. Data spots are disposed in positions, termed cells, which are rows and columns of a regular grid. Each transverse row of cells is usually read more than one time and these cells must be in alignment with the linear detector array. Since the entirety of a row is read almost simultaneously, a new error checking scheme is possible. For example, cells at opposite edges of a row may always have spots, or specified spot patterns. Each row of cells contains a discrete set of cells which collectively make up usable data. This row can be called a "track". Each row is read out by the detector array in parallel with a single scan of the contents of the array. The image of the "track" is smaller than the total view of the detector array. This allows electronic tracking to be accomplished with no alignment motion of the card or the electronics.

The card can be moved in (1) an incremental fashion, where the card or optics is stepped to each new row and the data is recovered, or (2) a uniform motion where the electronics continuously reads rows of data until a high quality read is found. The electronics can detect a new row of data by special marks on the ends of the row.

The system minimizes error resulting from crosstalk and other sources by having at least two of the detectors of the array observe each data cell. Output from the number of detectors observing a cell are used to determine whether or not a spot is present within a particular cell. For example, if two of three detectors have voltage levels indicative of a spot, then presence of the spot is assigned to that particular cell. However, if only one detector cell indicates a spot, the cell is determined to be empty. This technique is also helpful because spots may not be centered in a cell or have a geometrically optimal, shape.

BEST MODE FOR CARRYING OUT THE INVENTION

Figure 1:
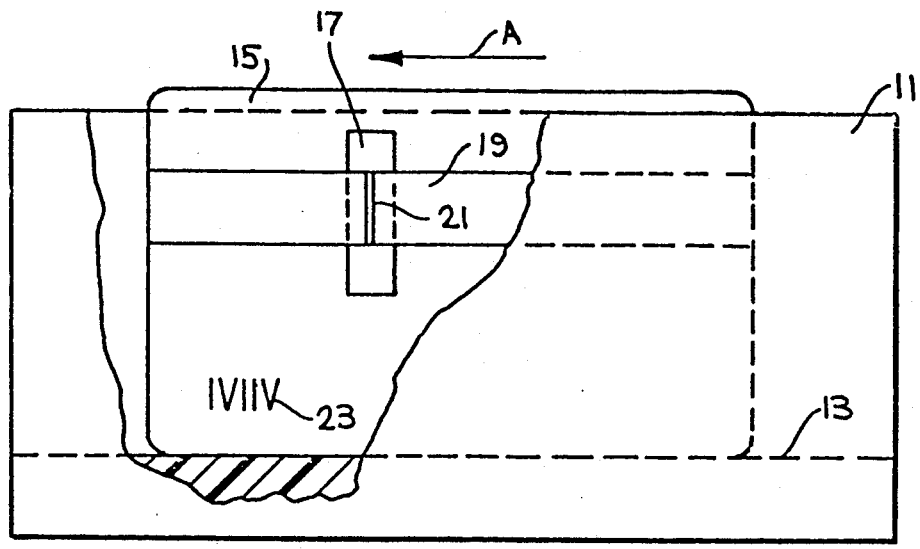
FIG. 1 is a front plan view of an optical data read-only system in accord with the present invention.

With reference to FIG. 1, a card transport 11 is shown. The transport includes a rail 13 which supports a card 15, such as a credit card. The transport 11 includes a readout head 17 mounted for scanning a strip 19 carried by card 15. Strip 19 is an optical storage medium, preferably of the reflective type, such as one formed from a silver-halide emulsion which has been photolithographically exposed through a mask to actinic radiation and developed to produce a medium with dark spots in a reflective field. Strip 19 may also be formed from diazo or vesicular type films. These materials are commercially available from Xidex Corporation and others. The medium may also be produced with reflective spots in a dark field. Other types of reflective or transmissive optical storage material, which can support pre-encoded data, formed by laser or other techniques, such as those previously mentioned in U.S. Pat. Nos. 4,269,917; 4,304,848 and 4,363,870, can be used.

The readout head 17 holds a linear array 21 of optical detectors, such as a CCD array. The linear array has a line of detectors which spans at least one row of data on strip 19 at a time. Card 15 may have other indicia thereon, such as alphanumeric indicia 23 serving as eye-readable identification information. As the card is moved in the direction shown by the arrow A, by an automatic card advancing mechanism, strip 19 moves past the readout head 17 so that the strip 19 passes beneath the linear detector array 21. This allows microscopic data spots on the strip to pass beneath the readout head 17.

Figure 2:
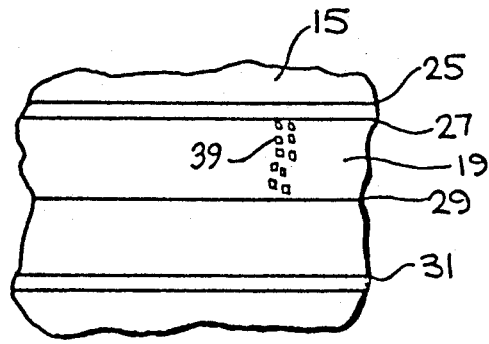
FIG. 2 is a frontal blowup view of a data strip having optically readable digital data thereon.

FIG. 2 shows a detail of the strip. The card 15 has a strip edge 25 a few millimeters from the upper edge of the card. The optical data strip spans the length of the card, similar to a magnetic data strip on a credit card. Inward from edge 25 is a first data area or band between parallel lines 27 and 29. A second data area or band exists between lines 29 and 31. The second data area or band is approximately the same size as the first. The lines 27, 29 and 31 are dark or reflective, parallel, spaced apart lines which assist in playback of information. Any number of such data areas may be disposed on a data strip, depending upon its width. The width of each data area is governed by the size and number of cells disposed across the area. At least one row in one band passes beneath the readout head. In the case of multiple, parallel bands, the detector array overlaps bands, as described below. A small quantity of spots 39 is shown. Here, the spots are disposed in two rows across the first data recording area. The spots are microscopic in size, typically have a dimension greater than 2 microns, with the preferred dimension being about 5 microns, and the spots range in dimension between 1 to 35 microns measured along an edge or diameter.

Figure 3:
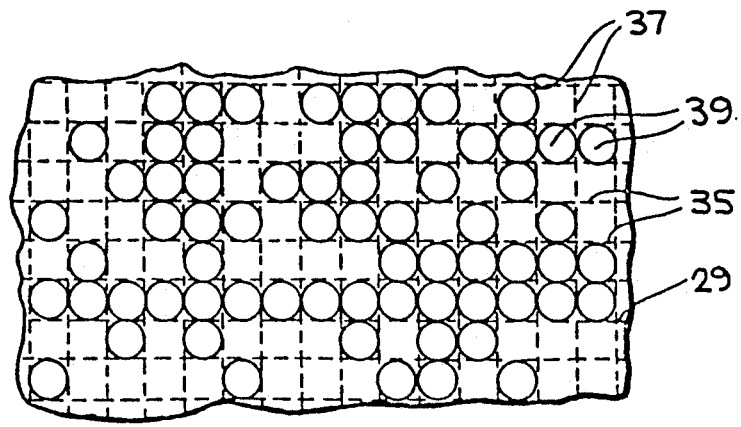
FIG. 3 is a plan view of data spots arranged in cells in accord with the present invention.

The data spots and their positions may be seen in FIG. 3. The dashed horizontal lines 35 and the dashed vertical lines 37 are imaginary, serving to indicate cells wherein data is written either photographically or by means of a laser. The cells are generally rectangular, although this is not necessary. Within the cells, spots 39 may be present or absent. The field in which the spots appear may be either reflective or dark. The presence of a spot may either decrease or increase the reflectivity of the field to an extent that a detector can detect light reflected from a spot and produce a corresponding signal. Previously described line 29 is seen defining the edge of a recording area. Data spots are typically dark, with a reflectivity at near infrared wavelengths (0.8 to 1.0 microns) generally less than 20% and preferably less than 15%, while the surrounding field or media background is substantially more reflective, with a reflectivity in the range of 30% to 50%. Optical reflective contrast between data spots and the surrounding field is therefore generally greater than 1.5 to 1, and preferably at least 3 to 1 at reading beam wavelengths. Alternatively, the data spots may be substantially more reflective than the background field, again with a contrast ratio of at least 1.5 to 1.

The spots need not be round, as shown, but may have any regular shape, such as square. There is no required number of cells in a row and no required numbers of columns of cells between spaced apart parallel lines. However, the number of cells in each row is preferably equal. Preferably, the spots are positioned such that they touch each other when adjacent, i.e. contiguous, in lateral and lengthwise directions.

Figure 4:
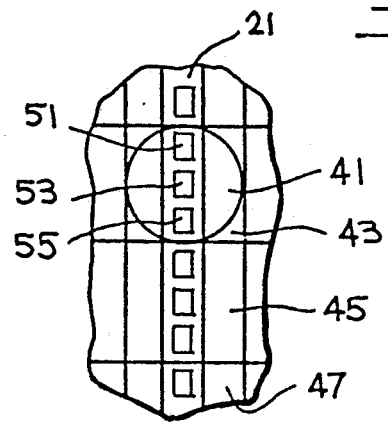
FIG. 4 is a detail of detector cells aligned for reading data spots in accord with the present invention.

FIG. 4 shows a linear detector array 21 passing over a portion of a grid having the data spot 41 within data cell 43. Data cells 45 and 47 are empty, as well as the other data cells which are pictured.

The linear detector array 21 has a plurality of detectors 51, 53, 55 disposed for sensing light directed to each cell. In this case, three detectors observe cell 43 and in the process detect spot 41. Since the detectors are typically CCD devices, the detector output is sensed by shifting charge levels from one end of the linear array to the other. The charge levels are measured in terms of voltages, with a high amount of reflectivity defined as the highest or lowest voltage condition and the lowest amount of reflectivity defined as the opposite voltage condition. A threshold level is defined between the maxima and the output from the number of detectors observing one cell can be used to determine whether or not a spot existed within a cell. For example, if two of three detectors have voltage levels indicative of a spot, then presence of the spot is assigned to that particular cell. However, if only one detector cell indicates a spot, the cell is determined to be empty and the single detector reporting a spot is believed to have detected foreign material within the cell.

Figure 5:
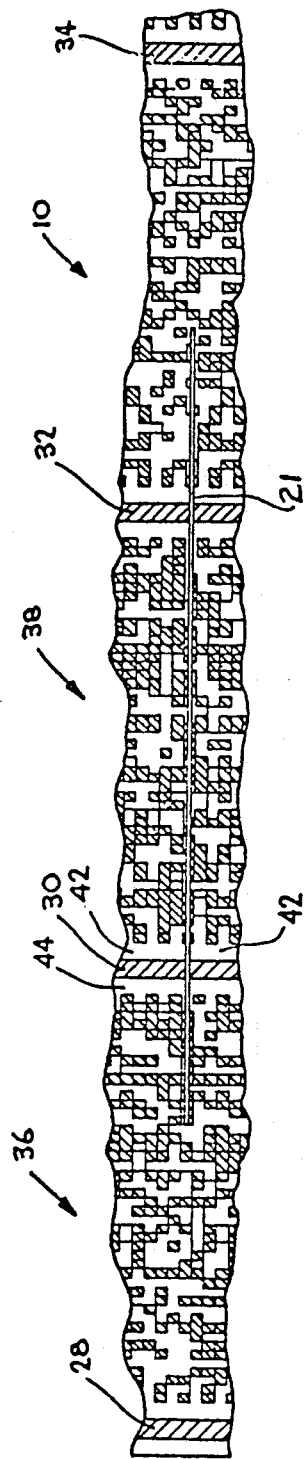
FIG. 5 is a plan view of data spots in a central band and neighboring bands, with a CCD array spanning the central band and portions of the neighboring bands.

With reference to FIG. 5, a portion of a data card is shown with three adjacent bands of data spots including central band 38 and neighboring bands 36 and 10. Band 36 is between parallel lines 28 and 30. Band 38 is between parallel lines 30 and 32. Band 10 is between parallel lines 32 and 34. Each band of data has 46 data cells between the reflective columns immediately adjacent to the absorptive parallel lines on either side of a band. The linear detector array 21 has a total of 256 detector cells uniformly spaced along the array. In reading data the detector array is over-filled with more than one band to enable the electronic tracking or crosswise skew detection of data spots. Approximately one-half of each neighboring band 36 and 10 is captured, as well as the entirety of the central band 38, which is primarily of interest. The linear detector array is preferably read several times so that ambiguities may be resolved by comparing successive reads of the same row. This is called lengthwise skew detection and is described further below. The central band 38 may be followed electronically by identification of the parallel lines 30 and 32, each having reflective columns on either side of the line, such as the columns 42 and 44 and data bits forming track marks at the end of each row. The track marks may indicate track numbers so that the address of each track is established. Once a band is read, such as band 38, the card, or the optics disposed above the card may be moved so that the next band of data may be read. This constitutes electronic tracking of data with very fine separation of relevant data from other data or non-data areas of the card.

Figure 6:
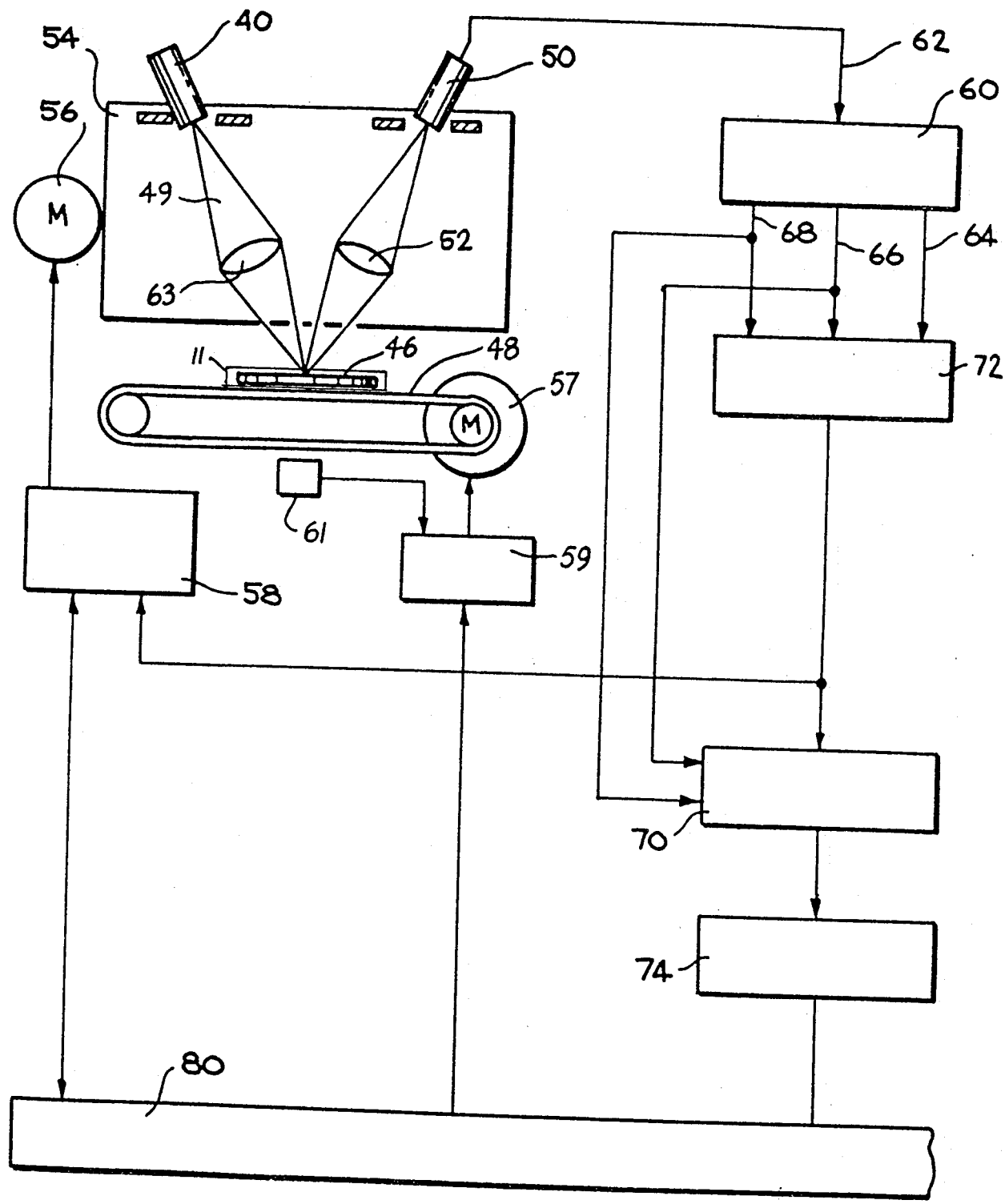
FIG. 6 is a block diagram of optical, mechanical and electrical components of a data strip reader mechanism in accord with the present invention.

With reference to FIG. 6, an optical data storage medium 46 is shown to be supported in a card transport 11 driven by a motor 57 via a belt 48. The card is held firmly in place by guides 13, seen in FIG. 1, serving to locate edges of the card. Motor 57 may be a stepper motor under control of motor servo 59. The transport is capable of moving card 46 back and forth, with extreme positions of the transport signaled by optical limits 61 which are electrically connected to motor servo 59.

A beam source, such as a laser 40, generates a radiation beam 49 directed toward the data bands on card 46 by means of optics 63 typically a focusing lens. Light reflected from the card is directed toward a linear detector array 50 by means of a lens 52. Light source 40 and detector 50 are mounted on the same side of the card on a movable support 54 which is driven by a motor 56. Light source 40 is a semiconductor laser operating at infrared wavelengths. The motor is a stepper motor which is controlled by a second motor servo 58. Both the first motor servo 59 and the second motor servo 58 are connected to a data bus 80 for computer control. The first servo 59 forces motor 57 to advance card 46 in a lengthwise direction so that successive rows of data may be read by the linear array 50. On the other hand, stepper motor 58 provides crosswise motion control so that various bands of data may be read.

The linear array 50 is able to electronically track and read successive rows of data, asynchronously scanning the data, in a sense, as the data is shifted out of the linear array. The start of each scan is indicated by means of a start pulse. As previously mentioned, a CCD driver 60 receives incoming data bits along line 62 and produces a start pulse along line 64 once the start of data is recognized. Since the data is self-clocking, clock pulses may be generated from the data stream arriving on line 62 and these clock pulses are sent to other system components along line 66. Undecoded data is transmitted along line 68 to a data decoder circuit 70 having memory with various data patterns. Clock pulses provide timing marks so that data patterns may be recognized. Data is also transferred to a reference line follower circuit 72 which recognizes the lines which mark the edges of each band. This enables the crosswise position or skew of data spots in a row relative to the linear array to be determined. One of the data patterns to be decoded consists of track marks on the card. Such marks are embedded in each row which, as previously indicated, is termed a "track". Reference line information is transmitted from reference line follower 72 to decoder circuit 70 so that track marks can be located adjacent to the reference lines. The memory of the bit decoder 70 contains a map indicating where data should be expected. A counter in the bit decoder cooperates with the map in order to match the data stream along line 68 to decoded data bits.

The linear array 50 is clocked at a rate so that each row of data is read at least a few times before the optics passes on to the next row. Each scan from the linear array is tested by means of specified marks or spot patterns at opposite edges of each row to find out if it is a new track. If it is a new track, then the best previous pattern match from the previous track is transferred to the data bus. Other scans from the previous track are discarded. Each scan of the same track is compared to the previous best decoded track until the best data pattern for that row has been selected when the next row scan is initiated. The best read is measured by reading the track marks at the end of each row. This selection of the best read of a row can be characterized as a lengthwise skew detection of data spots relative to the linear array, where zero skew constitutes the best read of a given row. Each track also may be checked for parity. Decoded data is transmitted to a line buffer 74 which converts data to parallel bytes for transmission to bus 80. A computer is connected to the data bus for testing data as described above and for providing error correction. The computer also provides control for the motor servos 59 and 58 using known servo correction and feedback techniques.

As previously mentioned, each card carries dark, or reflective, parallel reference lines separating bands of data. After a band has been read, the second servo 58 positions the optics for reading the next band. Instead of moving the optics, the card could have been moved in the crosswise direction.

In the present invention, the motors 56 and 57 provide coarse positioning of the card so that the linear array can scan a row of cells, plus neighboring cells on either side of the row. The CCD array separates the row from data in adjacent bands by utilizing the parallel lines and track marks at the edges of each row for crosswise skew detection and in this manner performs electronic tracking of the data. This may be considered to be fine tracking of the data which cooperates with the coarse tracking.

While the preferred embodiment has described a card having a strip of reflective material with dark spots thereon, it will be realized that a continuous strip could be wound on hubs, like tape. Moreover, the material need not be reflective with dark spots but could be dark with reflective spots or transmissive. Transmissive material would be read by light passing through the material onto a detector array on the opposite side of the material relative to the source. The material need not be a film material. Many types of laser data storage media can be used.

What is claimed is:

1. An optical data read system comprising, an optical data storage medium having optically readable digital data encoded by microscopic spots on said medium, the spots disposed in specified data cell positions, the cell positions forming a grid of perpendicular, non-overlapping rows and columns of cell positions, said columns aligned with a lengthwise direction of the medium, the spots having a reflective contrast ratio with respect to a surrounding field of said medium of at least 1.5 to 1, and a linear CCD array capable of detecting the reflective contrast between said spots and said surrounding field, said array on the same side of said medium as a light source aligned perpendicular to said columns of cell positions and having a plurality of fixed position detector cells imaging each specified data cell position in a row of cell positions, wherein at least two detector cells image a specified data cell position with groups of detector cells simultaneously imaging a plurality of cell positions.

2. The system of claim 1 wherein said storage medium comprises a strip of reflective optical data storage material.

3. The system of claim 2 wherein said strip of reflective optical data storage material is mounted on a wallet-size card.

4. The system of claim 1 wherein said spots are less reflective relative to a surrounding field which is more reflective.

5. The system of claim 1 wherein said spots are more reflective relative to a surrounding field which is less reflective.

6. The system of claim 1 wherein a first group of rows is separated from a second group of rows by a lengthwise optically absorptive line.

7. The system of claim 1 further comprising a first servo for adjusting the crosswise position of the storage medium relative to the CCD array.

8. The system of claim 7 further comprising a second servo for advancing the lengthwise position of the storage medium.

9. An optical data card read-only system comprising,
a data card having non-overlapping parallel rows of data cells arranged in groups of parallel columns, each data cell capable of holding a single bit of data of microscopic size having a reflective contrast ratio to a surrounding field of the data card of at least 1.5 to 1, each group of columns of data cells spaced from a neighboring group of columns, thereby forming parallel bands of data,
a beam source means for directing a light beam onto the card and beam detector means on the same side of said data card from said beam source means for reading said light beam after reflection from the card, said beam detector means capable of simultaneously reading a row of data cells, wherein said beam detector means include a linear array of fixed position detectors, wherein at least two detectors read each data cell, with groups of detector cells simultaneously imaging a plurality of cell positions, and
card transport means for advancing said card relative to the beam source means and beam detector means so that succesive rows of data can be read.

10. The system of claim 9 wherein parallel bands of data are separated by parallel, absorptive lines.

11. The system of claim 9 wherein each row of data cells has track marks at opposed ends, said track marks identifying a row.

12. The system of claim 9 wherein said beam detector means comprises a linear array having a width greater than a row of data, said linear array having detector cells imaging data in a row plus some data from rows in neighboring bands.

13. A method of reading optical data stored on a card comprising,
(a) reading data spots in a first row of a data card, the data spots disposed in parallel, non-overlapping rows and columns and having a reflective contrast ratio with respect to a surrounding field of the data card of at least 1.5 to 1, the data spots being read by a linear array of detector cells simultaneously imaging said data spots in said first row while said card is in a fixed position, each spot being read by at least two detector cells,
(b) advancing said card an incremental distance,
(c) reading data spots in a second row adjacent the first row while said card is in a second fixed position, and
(d) repeating steps (b) - (c) for successive rows of spots.

14. The method of claim 13 further defined by electronically tracking the positions of said data spots relative to said linear array for each row.

15. The method of claim 13 wherein the incremental distance said card is advanced corresponds to the spacing between adjacent rows.

16. The method of claim 14 wherein said electronic tracking includes determining lengthwise skew during reading of said data spots for selecting a best read of each row, said lengthwise skew being determined by the detection of specified spot patterns at the beginning and end of each row.

17. The method of claim 14 wherein said electronic tracking includes determining crosswise skew during reading of said data spots for each row, crosswise skew being determined by the detection of parallel, absorptive lines placed above and below said parallel rows of data spots.

18. An optical memory card comprising,
a substrate capable of supporting an optical data storage medium, and
a data storage medium disposed on the substrate, the medium having a rectangular non-overlapping array of storage cells with a length dimension and a width dimension, some of said storage cells having data spots therein of microscopic size, the remaining storage cells being empty, said data spots having a reflective contrast ratio with respect to a surrounding field of the medium of at least 1.5 to 1, the data being arranged in rows along the widthwise dimension, at least one end of each row having spots marking the presence of a row, each of the storage cells in a row having a size capable of being imaged by at least two adjacent detector cells in a linear array.

19. The card of claim 18 wherein said rectangular array of storage cells is divided into a plurality of bands by parallel, absorptive lines, each band containing a plurality of rows.

20. The card of claim 18 wherein the size of each spot is between 1 to 35 microns measured along an edge or diameter.

21. The card of claim 18 wherein at least some of said spots are contiguous in both lengthwise and widthwise directions.

22. The card of claim 18 wherein said spots are photographically prerecorded in a photosensitive emulsion, said emulsion forming said storage medium having an optically contrasting field surrounding said spots.

23. The card of claim 18 wherein said spots are less reflective of light in comparison to the surrounding field which is more reflective of light.

24. The card of claim 18 wherein said spots are more reflective of light in comparison to the surrounding field which is less reflective of light.

* * * * *